US012575993B1

(12) United States Patent
Medrano

(10) Patent No.: US 12,575,993 B1
(45) Date of Patent: Mar. 17, 2026

(54) SPINAL DECOMPRESSION RACK WITH ARTIFICIAL INTELLIGENCE

(71) Applicant: David Medrano, Allen, TX (US)

(72) Inventor: David Medrano, Allen, TX (US)

( * ) Notice: Subject to any disclaimer, the term of this patent is extended or adjusted under 35 U.S.C. 154(b) by 146 days.

(21) Appl. No.: 18/444,184

(22) Filed: Feb. 16, 2024

Related U.S. Application Data

(60) Provisional application No. 63/457,464, filed on Apr. 6, 2023.

(51) Int. Cl.
*A61H 1/02* (2006.01)

(52) U.S. Cl.
CPC ......... *A61H 1/0296* (2013.01); *A61H 1/0218* (2013.01); *A61H 2201/501* (2013.01)

(58) Field of Classification Search
CPC ................ A61H 1/0296; A61H 1/0218; A61H 2201/501; A61H 1/02; A61H 1/0292; A61H 2201/1611; A61H 1/0216; A61H 1/0229; A61H 3/008; A61H 2201/1623; A61H 2203/0487; A61F 5/04; A61F 5/048; A63B 24/0087; A63B 2023/006; A63B 23/0238; A63B 21/1618; A61G 1/00; A61G 1/01; A61G 1/013; A61G 1/04; A61G 1/044; A61G 2200/36
See application file for complete search history.

(56) References Cited

U.S. PATENT DOCUMENTS 9,427,371 B1 * 8/2016 Lamar .................... A47C 1/032

* cited by examiner

*Primary Examiner* — Ophelia A Hawthorne
(74) *Attorney, Agent, or Firm* — Kenneth L. Tolar

(57) ABSTRACT

A spinal decompression rack includes a padded backrest having an elongated telescoping shaft on a rear surface. The lower end of the shaft includes two pairs of spaced, padded foot cylinders for straddling the feet of a user lying on the backrest. The upper end of the shaft includes a pair of opposing padded arm rollers for engaging the user's armpits. The decompression rack also includes a hip attachment for stretching the spine by pulling the abdomen downwardly, and a neck harness for decompressing the cervical spine. On an intermediate portion of the shaft is a motor and an artificial intelligence controller that automatically extend and retract a piston attached to the lower shaft section to pull the user's feet or abdomen relative to the upper torso or neck.

12 Claims, 1 Drawing Sheet

SPINAL DECOMPRESSION RACK WITH ARTIFICIAL INTELLIGENCE

CROSS REFERENCE TO RELATED APPLICATIONS

This application claims priority of provisional application No. 63/457,464 filed on Apr. 6, 2023, the specification of which is incorporated herein by reference.

BACKGROUND OF THE INVENTION

The present invention relates to a portable rack that allows a user to decompress the spine without using an inversion rack or visiting a healthcare facility.

DESCRIPTION OF THE PRIOR ART

Chronic back pain is one of the most common health problems in the world. Muscle and ligament strains, obesity, poor posture, and degenerative conditions can all result in debilitating back pain. Moreover, routine activities such as sitting, standing, walking, and exercise constantly compress the spine. If not treated, back ailments can cause a variety of secondary problems, such as sciatica, neuropathy, walking difficulty and sleep deprivation.

Typically, back pain sufferers visit an orthopedist or chiropractor who prescribes various exercises and therapeutic stretches that are designed to relieve spinal pressure. A common treatment is spinal decompression wherein the spine is forcefully elongated to relieve pressure applied to compressed discs. A healthcare professional often decompresses the spine by connecting the patient to a traction device, which pulls upper and lower body parts in opposite directions. However, visiting a chiropractor or doctor usually requires inconvenient, time-consuming, and sometimes painful trips to a remote facility. During national emergencies, such as the recent Covid-19 pandemic, visiting a medical facility may be impossible. Furthermore, visiting a doctor for regular decompression therapy is expensive, particularly for the uninsured.

Although inversion racks purportedly allow a user to receive decompression therapy at home, they require the user to hang upside down, which is extremely uncomfortable and can cause nausea and other medical issues. In addition, the force applied to the spine is limited to the patient's body weight which may be excessive or inadequate for a given condition. Moreover, inversion racks do not allow minor adjustment of decompression forces along the spine to achieve optimal results. Smaller traction tables rely on hand cranks or other manual adjustment mechanisms that can only vary adjustment forces in major increments that can easily cause injury.

Accordingly, there is currently a need for a device that allows a user to decompress the spine without visiting a healthcare facility. The present invention addresses this need by providing a decompression rack that uses an artificial intelligence (AI) controller to automatically stretch the user's spine, while predicting and recommending future treatment, tracking a patient's treatment history, and monitoring progress.

SUMMARY OF THE INVENTION

The present invention relates to a spinal decompression rack comprising a padded backrest having an elongated telescoping shaft on a rear surface. The lower end of the shaft includes two pairs of spaced, padded foot cylinders for straddling the feet of a user lying on the backrest. The upper end of the shaft includes a pair of opposing padded arm rollers for engaging the user's armpits. The decompression rack also includes a hip attachment for stretching the spine by pulling the abdomen downwardly, and a neck harness for pulling and decompressing the cervical spine. On an intermediate portion of the shaft is a motor and an artificial intelligence controller that automatically extend and retract a piston attached to the lower shaft section to pull the user's feet or abdomen relative to the upper torso.

It is therefore an object of the present invention to provide a decompression rack that can easily be used in a home or office.

It is therefore another object of the present invention to provide a decompression rack that prevents time-consuming, costly visits to a healthcare facility when experiencing back pain.

It is therefore yet another object of the present invention to provide a decompression rack that is easily operated with a portable, artificial intelligence device.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
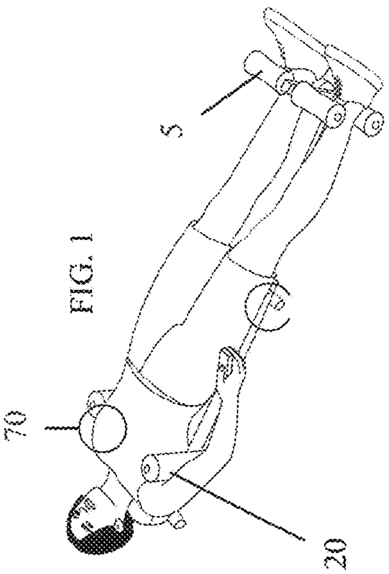
FIG. 1 is a perspective view of a user lying on the decompression rack according to the disclosed device.
Figure 2:
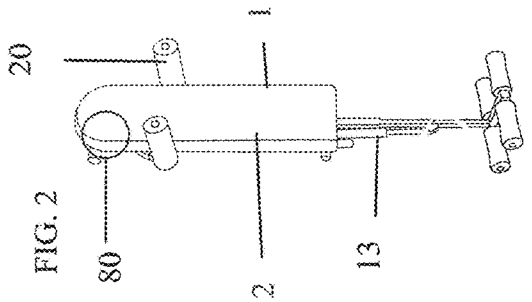
FIG. 2 is a front perspective view of the decompression rack.
Figure 3:
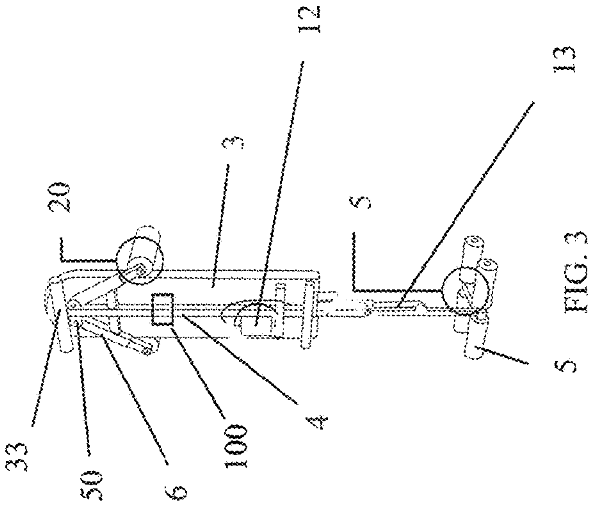
FIG. 3 is a rear perspective view of the decompression rack.
Figure 4:
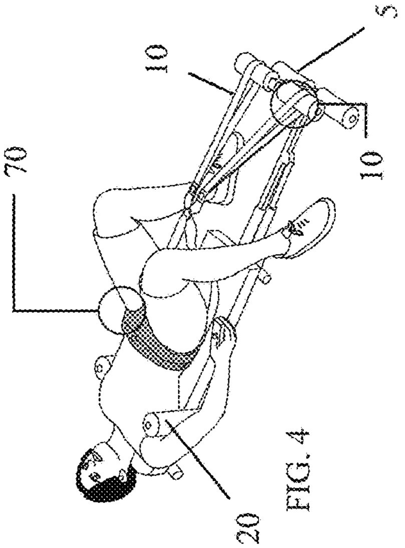
FIG. 4 is a perspective view of a user lying on the decompression rack using the hip attachment.
Figure 5:
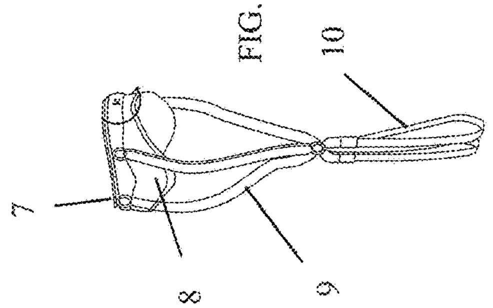
FIG. 5 is an isolated view of the hip attachment.
Figure 6:
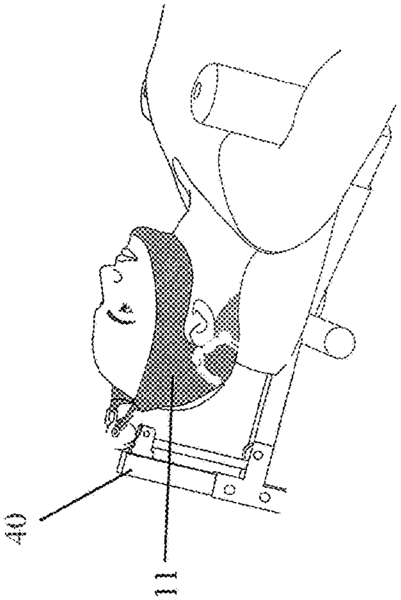
FIG. 6 is a perspective view of a user lying on the decompression rack using the neck harness.

The present invention relates to a spinal decompression rack comprising a padded backrest 1 having a front surface 2, a rear surface 3, a top edge, an upper end 80, a lower end, and a bottom edge. Attached to the rear surface of the backrest is an elongated telescoping shaft 4 having an upper end and a lower end. The lower end includes two pairs of spaced, padded foot cylinders 5 for straddling the feet of a user 70 lying on the backrest. The upper pair of cylinders are vertically adjustable using a telescoping shaft and a locking pin or a similar mechanism. At the upper end of the shaft is a header 33 and an underlying bracket 50 with a pair of length-adjustable bars 6 downwardly diverging therefrom. The bars 6 are pivotally attached to the bracket 50 to allow a user to adjust the space between the bars to accommodate varying-sized users. A distal end of each bar includes a padded arm roller 20 perpendicularly extending from a distal end. Each arm roller is adjacent a side edge of the backrest for engaging the armpits of a user lying on the backrest. The arm rollers fix the upper torso while the hips or feet are being pulled as described in more detail below.

The decompression rack also includes a hip attachment 7 for stretching the spine by pulling the abdomen downwardly instead of the feet. The hip attachment 7 includes a padded belt 8 for encircling the user's abdomen with a pair of adjustable straps 9 extending therefrom. The straps each include a loop 10 for encircling the padded foot cylinders to secure the hip attachment to the rack. The angle and height of the loops can be varied by adjusting the upper pair of cylinders to isolate and target certain vertebral discs.

The rack could also include a neck attachment including a support frame 40 that is removably securable to the header 33. The neck attachment includes a harness 11 attached to the support frame 40 for gripping the neck and chin to decompress the cervical spine.

On the intermediate portion of the shaft is a motor 100 and a controller 12 that automatically extend and retract a piston, a pneumatic or hydraulic cylinder, or a similar mechanism 13, that is fastened to the lower shaft section to pull the user's feet or abdomen. The controller is operated by a handheld remote unit or a portable electronic device having a specifically configured software application. In one embodiment, the controller includes artificial intelligence (AI) technology that regulates and restricts the amount of force applied to the piston and sets a maximum extension distance for a given session to prevent injury. The user is also able to easily set and adjust operating parameters, such as extension force, speed, pause time, and number of repetitions for a given session. The AI technology also records the results of each decompression session for future reference, analysis and formulating future treatment plans. The AI controller requires minimal physician input and therefore allows the patient to receive supervised spinal decompression from any remote location via virtual visits using the internet or other communication means. In another embodiment, the controller is a microcontroller and associated software that is operable by the patient at home, in an office or in a similar environment without any interaction from a healthcare worker. Accordingly, the patient can undergo spinal decompression treatment without a costly visit to a healthcare facility.

The above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A spinal decompression rack comprising:

a backrest having a front surface and a rear surface;

a telescoping shaft on the rear surface of said backrest, said telescoping shaft having an upper end and a lower end;

a foot restraint at the lower end of said shaft for gripping a user's feet;

an upper restraint at the upper end of said shaft for gripping a user's torso;

a motor for automatically extending said shaft;

a controller that activates said motor at a predetermined speed, direction, and torque to elongate a user's spine.

2. The spinal decompression rack according to claim 1 wherein said controller is an artificial intelligence controller.

3. The spinal decompression rack according to claim 2 wherein said artificial intelligence controller regulates extension force, extension distance, extension and retraction speed, extension pause time, and number of extension and retraction repetitions of said shaft for a given interval.

4. The spinal decompression rack according to claim 3 wherein said artificial intelligence controller records results of a given decompression session for future reference and analysis.

5. The spinal decompression rack according to claim 1 wherein said foot restraint includes a plurality of cylinders for straddling the feet of a user lying on the backrest.

6. The spinal decompression rack according to claim 1 wherein said upper restraint comprises arm rollers for engaging a user's armpits.

7. The spinal decompression rack according to claim 1 further comprising a hip attachment on an intermediate portion of said backrest for stretching the spine by pulling a user's abdomen downwardly.

8. The spinal decompression rack according to claim 1 further comprising a neck harness at an upper end of said backrest for stretching and decompressing a user's cervical spine.

9. The spinal decompression rack according to claim 7 wherein said hip attachment includes a padded belt for encircling the user's abdomen with a pair of adjustable straps extending therefrom, said straps each having a loop for encircling the foot restraint to secure the hip attachment.

10. The spinal decompression rack according to claim 1 wherein said controller is operated by a portable electronic device.

11. The spinal decompression rack according to claim 1 wherein said upper restraint comprises:

a bracket with a pair of length-adjustable, downwardly diverging bars pivotally attached thereto;

a padded arm roller at a distal end of each of said length-adjustable, downwardly diverging bars for engaging a user's armpits.

12. The spinal decompression rack according to claim 1 wherein said controller is a processor.

* * * * *